United States Patent [19]
Crandell

[11] 3,970,821
[45] July 20, 1976

[54] ELECTRICALLY HEATED TORPEDO

[75] Inventor: Walter R. Crandell, Addison, Ill.

[73] Assignee: Fast Heat Element Manufacturing Co., Inc., Elmhurst, Ill.

[22] Filed: Oct. 21, 1974

[21] Appl. No.: 516,618

[52] U.S. Cl. .................... 219/523; 219/510; 219/544; 338/240; 425/144
[51] Int. Cl.² .................... H05B 3/54; B29F 1/08
[58] Field of Search .......... 219/510, 523, 541, 544, 219/552, 553; 338/238, 239, 240, 242, 273, 274; 425/143, 144, 145, 243, 247; 29/611; 259/191

[56] References Cited
UNITED STATES PATENTS

| | | | |
|---|---|---|---|
| 2,202,140 | 5/1940 | Burroughs | 425/145 |
| 2,436,869 | 3/1948 | Lester | 425/144 |
| 2,475,395 | 7/1949 | Lester | 425/144 |
| 2,814,070 | 11/1957 | Buckley et al. | 425/144 |
| 2,831,951 | 4/1958 | Desloge | 338/241 |
| 3,080,543 | 3/1963 | Boggs | 338/273 |
| 3,189,948 | 6/1965 | Whitney | 425/144 |
| 3,217,279 | 11/1965 | Boggs | 338/239 |
| 3,310,769 | 3/1967 | Simmons | 338/241 |
| 3,499,189 | 3/1970 | Perras | 425/144 |
| 3,510,550 | 5/1970 | Indrike | 425/143 X |
| 3,582,616 | 6/1971 | Wrob | 338/238 X |
| 3,668,598 | 6/1972 | Drugmand et al. | 338/274 |
| 3,751,014 | 8/1973 | Waterloo | 425/144 X |
| 3,807,914 | 4/1974 | Paulson | 425/144 |
| 3,812,580 | 5/1974 | Drugmand | 219/544 X |
| 3,884,607 | 5/1975 | Gerhards | 425/144 |
| 3,911,251 | 10/1975 | Day | 219/523 |

Primary Examiner—Volodymyr Y. Mayewsky

[57] ABSTRACT

A torpedo heater device for plastic molding or diecasting equipment comprised of a novel casing having an integral heater core and means to seal the casing for retaining the heater core in place and preventing loss of thermal transmitting packing contained in the casing, and which is structured to receive the heater core in the area close to its tip, which is tapered. The casing may also include a probe for a thermocouple or a thermocouple well.

6 Claims, 8 Drawing Figures

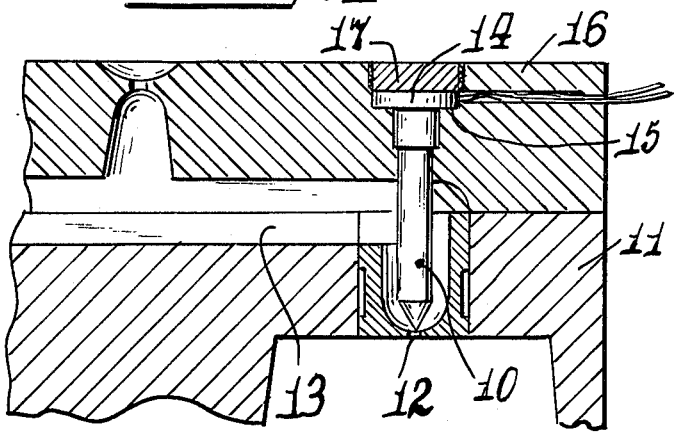
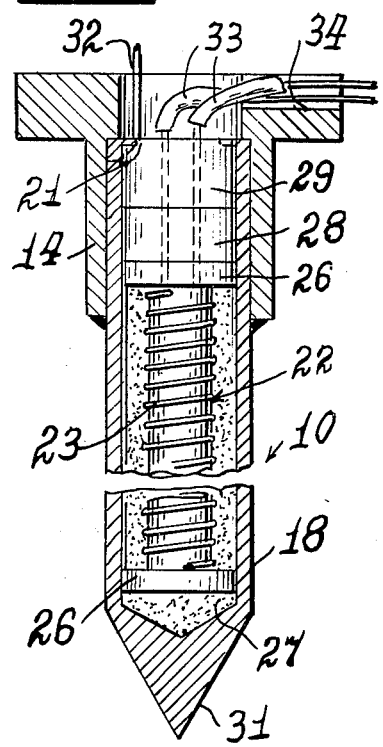
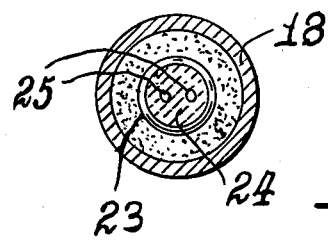
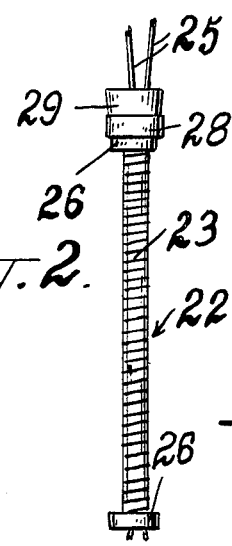
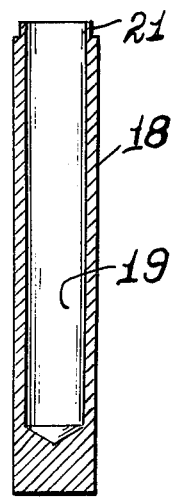
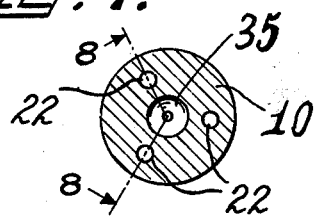
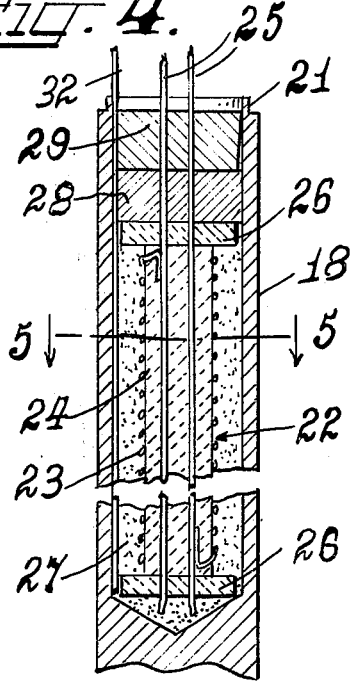

ELECTRICALLY HEATED TORPEDO

The invention relates to improvements in electrically heated torpedos or spreaders for plastic molding or diecasting equipment, and to the method of making the same. Such devices are intended to be inserted into the flow orifice of the sprue fitting of the equipment to maintain the temperature of the material flowing therethrough during ejection into a mold or die. The torpedo includes an internal heater body integral therewith comprised of a ceramic core haivng a resistance wire coiled thereabout and provided at is ends with frangible ceramic spacer discs that hold the heater body axially spaced from the walls of its metal casing. The ends of the resistance wire are connected one to each of a pair of leads that extend through holes in the core and project to the outside of the assembly for connection with a source of electric current. The space inside the casing, not occupied by the core, coil and leads, is filled and packed with magnesium oxide powder or similar heat transfer material, such as aluminum oxide or boron nitride powders, to maintain a high level of heat transfer between the coil and casing and to provide an electrical insulation between the coil and casing. One end of the casing is tapered so that the bushing can function as a valve needle in the flow orifice.

The heater-casing assembly is swaged or rolled, thereby pulverizing the ceramic spacer discs and compressing the magnesium oxide powder firmly between the heater body and casing to insure that all voids in the casing are filled. The heater assembly is formed as an integral unit, thus affording optimum heat transfer characteristics between the heating core and casing. The open end of the torpedo casing is rolled over suitable removable fiber and nylon discs placed at the related end of the torpedo to prevent slippage or loss of heater components during assembly and swaging of the device.

It is therefore an object of the invention to provide a unitary heated torpedo of the character referred to.

Another object is to provide a heated torpedo of the character referred to with novel means to close the open end of its casing to retain the heater element in place therein.

Another object is to provide a heated torpedo of such character that the heater element therein terminates closely adjacent to the tapered end of its casing to insure uniform heating of the entire torpedo in which it is encased.

Another object is to provide a compressed torpedo device of a given minimum size capable of producing high operating temperatures.

Another object is to provide an integral heated torpedo without air voids therein.

Another object is to provide a heated torpedo of such a character which is not difficult or expensive to manufacture and which is very efficient in its use and increases heater life substantially over the life of conventional cartridge heaters, and which is easy to replace when no longer serviceable.

Other objects and advantages of the invention will become apparent with reference to the following description and the accompanying drawings.

In the drawings:

FIG. 1 is a fragmentary sectional view of an insulated runner system incorporating an illustrative embodiment of the novel improved heated torpedo.

FIG. 2 is an elevational view of the heater element.

FIG. 3 is a central sectional view of the casing.

FIG. 4 is an enlarged fragmentary central sectional view of the heater-casing assembly before sealing the insert end thereof and before compression of the casing.

FIG. 5 is a diametrical sectional view of the heater-casing assembly taken on line 5—5 of FIG. 4.

FIG. 6 is an axial sectional view of the completed heated torpedo device.

FIG. 7 is an end view of a modified torpedo made according to the invention and having multiple heater elements therein.

Figure 8:
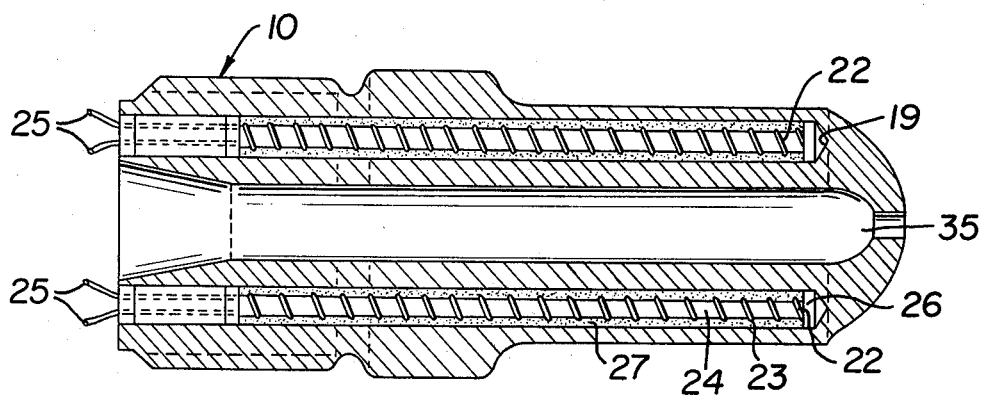
FIG. 8 is a sectional view along the axis of the nozzle of a diecasting machine, taken on line 8—8 of FIG. 7.

Referring to the exemplary disclosure in the accompanying drawings, and particularly to FIG. 1, the electrically heated torpedo device 10 is of a type that is mounted in the molding head 11 of a plastic injection molding machine in a manner that enables it to function as a needle valve for the injection orifice 12 leading from the runner 13. The heated torpedo device may include an externally flanged fitting or collar 14 which is seated on a shoulder 15 formed in a stationary plate 16. A threaded cap plug 17 may retain the torpedo device in place.

Specifically, the heated torpedo device 10 is fabricated from a cylindrical metal casing 18 (see FIG. 3) having an axial bore 19 which extends substantially the length of the casing and terminates short of one end thereof. The other or open end of said casing has a reduced diameter flange 21 surrounding its open end. This casing receives therein an unsheathed heating element 22.

As best shown in FIGS. 2 and 4, the heating element 22 comprises a resistance wire 23 which is wound tightly upon a ceramic core 24 which is of a diameter less than the diameter of the bore 19 in the casing, but shorter in length. The core has two holes extending from end to end which receive lead pins or wires 25 projecting beyond the ends of the core, as shown. One end of the wound resistance wire 23 is secured electrically to one of the leads, whereas the other end of said resistance wire is connected electrically to the other of the leads.

Arranged at each end of the core, with the leads 25 extending therethrough, is a thin frangible ceramic spacer 26, also slightly smaller in diameter than the diameter of the bore 19. With this heating element assembly inserted into the bore 19, as best shown in FIG. 4, heat transmitting material such as magnesium oxide powder 27 or similar material is placed in the space between the heating element 22 and the casing 18, whereupon a mica or lava washer 28 and a nylon washer 29, having holes therein to permit passage of leads 25, are fitted into the open end of bore 19 firmly against one another and against the related end of the heating element 22.

The assembly is vibrated to pack the magnesium oxide powder tightly within the casing, as to fill all air voids within the assembly, and the casing flange 21 is then spun, or rolled over into the nylon washer 29. The nylon washer may be removed to provide a flat end after swaging, as best shown in FIG. 6. This procedure tightly locks the heating element 22 and the magnesium oxide powder 27 within the casing.

The assembly of the metal casing 18 and heating element 22 is then swaged, so as to reduce the diameter of the casing and to compress the packed magnesium oxide powder 27 into all voids within the bore 19. This provides an effective heat transfer contact between the heating element 22 and the casing 18, and insures uniform heating of the casing. The closed casing end is then tapered, as at 31, preferably by milling, thus providing a shaped point to regulate the flow of material through the runner orifice 12. The construction also insures the location of the heating element 22 very close to the body end 31 and on the whole permits lowest internal operating temperatures with the application of highest watt density. Temperatures can be controlled by a thermocouple, in which case the lead 32 may be embedded in the magnesium oxide powder, or a thermocouple well may be utilized with the thermocouple probe slipped therein.

The flanged fitting or collar 14 is then welded to the metal casing and the extending ends of the lead wires 25 are encased in ceramic sleeves 33 and laid in a radial trough 34 formed in the collar. Said wires are then connected to suitable wires leading to a source of electric current.

In the FIG. 7 disclosure, the heated torpedo is of a type having three heating elements 22 spaced about the central flow orifice 35, and the heater cores 24 are encased in the bores or wells 19 and integral with the torpedo body 10, as disclosed hereinabove with respect to the single heater torpedo. Such a structure is particularly useful in a nozzle for a diecasting machine.

Although I have described preferred embodiments of the invention in considerable detail, it will be understood that the description thereof is intended to be illustrative rather than restrictive, as details of the structure and the steps of the method may be modified or changed without departing from the spirit or scope of the invention. Accordingly, I do not desire to be restricted to the exact construction described and shown.

I claim:

1. An integral heated torpedo for maintaining material passing over an exposed surface thereof at an elevated temperature, comprising, in combination, an unsheathed electrical heating element, lead wires extending from said heating element for electrically connecting said heating element to a power source, a heat conductive torpedo body having a bore closed at one end containing said heating element and a surface on the body in heat transfer relation with said heating element, said surface being adapted to define a passage for said material, said torpedo body being tapered at said closed end, heat transmitting material compacted in the bore and surrounding said heating element for electrically insulating the heating element from the torpedo body and filling all air voids between said torpedo body and said heating element to effect direct heat transfer to the torpedo body from the heating element, insulating means sealing the open end of said torpedo body bore, and temperature control means for regulating the temperature of said heating element and said torpedo body.

2. The heated torpedo device recited in claim 1, wherein the torpedo body is arranged in the sprue of a molding machine and its tapered tip is in the line of flow of the sprue.

3. The integral heated torpedo recited in claim 1, wherein said heating element comprises an insulating core having openings extending throughout the length thereof, a resistor wire wound upon said core and having end portions, one end portion being adjacent each end of said core and connected to said lead wires, and a ceramic spacer at each end of the core and through which the lead wires extend.

4. The heater assembly recited in claim 3, wherein the end portions of the resistor wire are extended one into each opening and have intimate electrical contact with the lead wire therein.

5. The integral heated torpedo recited in claim 1, wherein said control means comprises a thermocouple contained in the bore adjacent the torpedo body.

6. The heated torpedo recited in claim 1, wherein the torpedo body has an internal flange at the open end of said bore overlying the peripheral margin of the insulating means.

* * * * *